US005702825A

United States Patent [19]
Keita et al.

[11] Patent Number: 5,702,825
[45] Date of Patent: *Dec. 30, 1997

[54] LOW YELLOW INDEX POLYMER COMPOSITIONS, POLYMERIZABLE COMPOSITIONS AND LENSES USING SAID COMPOSITIONS

[75] Inventors: Gabriel Keita, Courbevoie; Joel Renaudineau, Creteil, both of France; Leanirith Yean, Largo, Fla.

[73] Assignee: Essilor International (Compagnie Generale d'Optique), Charenton Cedex, France

[*] Notice: The term of this patent shall not extend beyond the expiration date of Pat. No. 5,442,022.

[21] Appl. No.: 695,790

[22] Filed: Aug. 12, 1996

Related U.S. Application Data

[63] Continuation-in-part of Ser. No. 374,378, Jan. 8, 1995, Pat. No. 5,545,828, which is a continuation-in-part of Ser. No. 172,137, Dec. 21, 1993, Pat. No. 5,442,022.

[30] Foreign Application Priority Data

Dec. 22, 1992 [FR] France ................... 92 15533

[51] Int. Cl.[6] .................. B32B 27/20; C08F 232/04; C02B 1/04

[52] U.S. Cl. ............... 428/500; 526/72; 526/281; 526/286; 526/289; 526/309; 526/313; 524/154; 522/178

[58] Field of Search ............... 526/72, 281, 286, 526/289, 309, 313; 522/178; 524/154; 428/500

[56] References Cited

U.S. PATENT DOCUMENTS

| | | | |
|---|---|---|---|
| 4,931,523 | 6/1990 | Watanabe et al. | 526/292.3 |
| 5,442,022 | 8/1995 | Keita et al. | 526/309 |
| 5,545,828 | 8/1996 | Keita et al. | 526/72 |

FOREIGN PATENT DOCUMENTS

| | | |
|---|---|---|
| 0 059 561 | 9/1982 | European Pat. Off. . |
| 2 431 511 | 2/1980 | France . |
| 9 215 533 | 9/1993 | France . |
| 1 514 810 | 6/1978 | United Kingdom . |
| WO 92/05209 | 4/1992 | WIPO . |

*Primary Examiner*—Mark Nagumo
*Attorney, Agent, or Firm*—Arnold, White & Durkee

[57] ABSTRACT

The present invention relates to a new polymer compositions for use in the manufacture of ophthalmic lenses, to their use in ophthalmology and to apparatus using these lenses, such as eyepieces and film/video camera optics.

32 Claims, No Drawings

LOW YELLOW INDEX POLYMER COMPOSITIONS, POLYMERIZABLE COMPOSITIONS AND LENSES USING SAID COMPOSITIONS

This application is a continuation-in-part application under 35 U.S.C. § 120 of application Ser. No. 08/374,378, filed Jan. 18, 1995, now U.S. Pat. No. 5,545,828, which is a continuation-in-part of application Ser. No. 08/172,137, filed Dec. 21, 1993, now U.S. Pat. No. 5,442,022. This application also claims priority under 35 U.S.C. § 119 from French patent application 9215533, filed Dec. 22, 1992.

The present invention relates to new polymer compositions for use in the manufacture of ophthalmic lenses, to their use in ophthalmology and to apparatus using these lenses, such as eyepieces and film/video camera optics.

Ophthalmic plastics obtained from acrylic bisphenol A derivatives are in general too yellow for use.

Polymers produced from a monomer having formula I and the copolymers described in FR-A-2 431 511 are, however, too yellow to be usable in ophthalmology without modification.

The invention consists in polymers constituted by units derived from monomers having formula I and allyl alcohol derivatives.

The invention further consists in polymerisable compositions comprising monomers having formula I and allyl alcohol derivatives.

The invention further consists in ophthalmic lenses produced from these polymers, their use in ophthalmology and apparatus containing these optics.

Further objects of the invention will become apparent from the following description and examples.

A polymer composition in accordance with the invention is characterized in that it is obtained by polymerisation of a polymerisable composition comprising:

at least 50% and preferably 70 to 100% by weight of a monomer or mixture having formula I

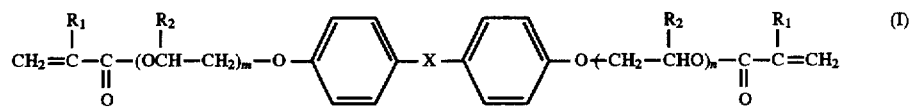

wherein $R_1$ and $R_2$ independently of each other may represent hydrogen or a low $C_1$-$C_6$ alkyl radical, X represents

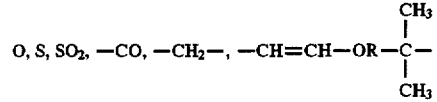

m and n are integers and the sum m+n being between 0 and 10, and 0 to 50% by weight of one or more mono- or polyfunctional vinyl, acrylic or methacrylic comonomers (II);

(B) a component B in a proportion of 0.05 to 15%, preferably 0.1 to 15% and most preferably 0.1 to 5% by weight with respect to the weight of monomers (I) and (II) of at least one monomer (III) comprising an ethylenic unsaturation which does not form part of an aromatic ring and containing in position α of this unsaturation, a carbon atom carrying a free hydroxy group and preferably linked to at least one hydrogen atom.

The use of additives which reduce yellowness is well known, but usually at the cost of the degree of polymerisation and thermomechanical properties.

Ophthalmic lenses may be produced in their final shape by casting polymerisable compositions between two moulds having the required surface geometries, then polymerising. A lens is then obtained with its two surfaces in their final state.

In order to reduce the need for large stocks of ophthalmic lenses, semi-finished lenses are often made which have one moulded side only in its final geometry, the second side being finished when required.

Finishing the second side raises the temperature of the semi-finished lens and it is therefore vital that the polymer constituting the lens is sufficiently rigid and non-deformable at the temperature attained. The polymer must therefore have good thermomechanical properties.

The applicant has discovered that it is possible to produce polymers for the manufacture of ophthalmic lenses in accordance with the invention which have good thermomechanical properties and a low yellow index making them particularly suitable for use in the manufacture of ophthalmic lenses from a copolymerisable composition comprising at least one monomer having formula The ethylenic unsaturated monomers (III) used according to the invention are preferentially selected from the monomers having formula (IV).

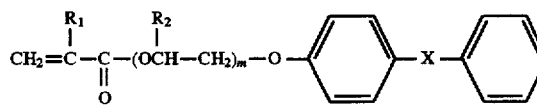

and at least one monomer derived from allyl alcohol. This composition constitutes an object of the invention.

Monomers having formula I are known and some of their derivatives have already been recommended for use in ophthalmology (GB-A-1 514 810, FR-A-2 431 511). In the latter document, monomers having formula I are used with monomers which are copolymerisable by a radical mechanism, wherein the homopolymer has an index greater than or equal to 1.55 to produce high index lenses.

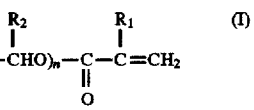

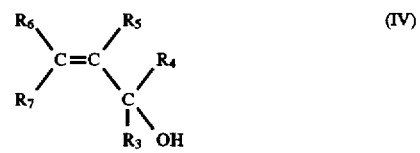

wherein $R_3$ and $R_4$ represent hydrogen or one of the groups $R_3$ and $R_4$ represent hydrogen while the other forms with group $R_7$ a $C_5$-$C_{10}$ ring which may be substituted by one or more linear or branched $C_1$–$C_4$ alkyl groups or one or more $C_2$–$C_4$ alkylene groups; or one of groups $R_3$ and $R_4$ may represent hydrogen while the other represents an aliphatic $C_1$–$C_6$ alkyl group, a cyclic $C_4$–$C_{16}$ hydrocarbon group or an aromatic $C_6$–$C_{16}$ hydrocarbon group;

$R_5$, $R_6$ and $R_7$, independently of each other, represent hydrogen or a $C_1$–$C_6$ alkyl group which may be substituted by one or more OH groups and wherein the chain may be interrupted by one or more ether, ester or ketone groups; an aromatic $C_6$–$C_{16}$ hydrocarbon group or a cyclic $C_4$–$C_{16}$ hydrocarbon group;

$R_7$ may form with one of the groups $R_3$ or $R_4$ and $C_5$–$C_{10}$ ring which may be substituted by one or more linear or branched $C_1$–$C_4$ alkyl groups or one or more $C_2$–$C_4$ alkylene groups;

$R_5$ and $R_6$ may form a $C_5$–$C_{10}$ ring which may be substituted by one or more $C_1$–$C_4$ alkyl groups or $C_2$–$C_4$ alkylene groups;

two or more of the carbon atoms of the $C_5$–$C_{10}$ ring formed with $R_3$ or $R_4$ and $R_7$ or with $R_5$ and $R_6$, may be bonded by a hydrocarbon bridge.

In accordance with the invention, the $C_1$–$C_6$ alkyl group preferably represents a methyl or ethyl group.

Particularly preferred monomers having formula I are those wherein $R_1$ denotes $CH_3$ and $R_2$ denotes hydrogen and X represents

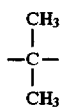

and m+n is a whole number between 2 and 7. Particularly preferred monomers having formula III are those wherein $R_3$ and $R_4$ represent hydrogen, $R_5$ represents methyl, $R_6$ represents hydrogen or methyl and $R_7$ represents hydrogen, methyl, ethyl or $CH_2OH$.

Preferred polymers are those wherein the monomer having formula I is 2,2-bis (4-methacroyloxydiethoxyphenyl) propane.

Monomers having formula II may be aromatic or non-aromatic.

The following monofunctional aromatic compounds may be cited: phenyl(meth)acrylate, benzyl(meth)acrylate, phenoxyethyl(meth)acrylate, styrene.

The following non aromatic compounds are preferred: a monofunctional alkyl(meth)acrylate such as methyl(meth)acrylate, ethyl(meth)acrylate, butyl(meth)acrylate or isobutyl(meth)acrylate or difunctional derivatives such as butanedioldi(meth)acrylate, or trifunctional derivatives such as trimethylolpropane tri(meth)acrylate.

Particularly preferred monomers having formula IV are allyl alcohol, methallyl alcohol, crotyl alcohol, 2-cyclohexene 1-ol, trans 2-hexene-1-ol, cis 2-butene 1,4-diol, 3-methyl-2-butene-1-ol, trans 2-methyl-3-phenyl-2-propane-1-ol, 3-butene-2-ol, carveol, myrtenol, verbenol and trans-cinnamyl alcohol.

The polymerisable compositions and the polymer compositions in accordance with the present invention may further include usual anticoloring agents such as phosphinic compounds, for example triphenylphosphine. The amounts of anticoloring agents used in the present compositions are the usual amounts, preferably 0.01 to 0.5% by weight.

Polymerisation is effected in a known manner using an initial mixture containing the various monomers of the polymerisable composition, the polymerisation reaction being catalysable using catalysts such as benzoyl peroxide, cyclohexyl peroxydicarbonate, diisopropyl peroxydicarbonate or 2,2'-azo-bis isobutyronitrile. The catalysts are used in quantities sufficient to initiate or maintain polymerisation and are normally present in proportions of between 0.001 and 1% by weight with respect to the total weight of the polymerisable composition.

Ophthalmic lenses are prepared by introducing the desired composition containing the various monomers described above into an apparatus constituted by a glass two-part mould and initiating a thermal polymerisation cycle of 10 to 20 hours duration at about 45° C. to 90° C., preferably about 50° to 85° C. It is also possible to polymerise photochemically or by induction heating using electromagnetic radiation, such as microwaves (2 450 MHz or 915 MHz) or high-frequency radiation (3.56 MHz; 27.12 MHz or 40.68 MHz).

Polymerisation by induction heating is normally completed in a period of less than one hour.

The polymer lens thus produced is then annealed for a period and at a temperature sufficient to eliminate residual stresses in the lens. The temperature is generally between 100° and 120° C. and annealing is carried out for about 1 to 5 hours.

It is also possible to effect polymerisation using moulds with one surface conforming to the final lens geometry and a second surface which does not conform to the final lens surface geometry but produces a second lens surface which can be finished when required.

The invention also consists in a polymerisable composition as defined above when used in the preparation of polymer compositions.

The polymerisable compositions and the polymer compositions thus obtained, particularly following moulding, may be used to produce ophthalmic components such as ophthalmic lenses, spectacle or eyepiece lenses, and the optics of various devices including cameras, film/video cameras and microscopes for example.

In particular, these compositions are especially suitable for producing photochromic substrates and items such as photochromic ophthalmic lenses. Thus, the invention also concerns photochromic substrates made of a polymer composition as described above which further includes one or more photochromic compounds.

Preferably, the photochromic compound is incorporated into a substrate made of the moulded polymer composition up to a depth of 100 to 150 µm from a surface of the substrate. Incorporation of the photochromic compound is preferably effected by a thermal transfer process.

Such a thermal transfer process is well-known and is disclosed in U.S. Pat. Nos. 4,286,957 and 4,880,667.

Any usual photochromic compound useful in the optical field may be used for making the photochromic substrates and items according to the present invention, the prefered photochromic compounds being of the chromene type.

The yellow index is determined spectroscopically and visually. A standardised method is used to determine the yellow index by the spectroscopic method (ASTM D-1325-63). The yellow index is defined as follows:

$$Y_i = \frac{(127.5X - 105.8Z)}{Y}$$

where X, Y, Z are trichromatic coordinates of the sample measured using a UV-visible spectrophotometer scanning the spectrum from 380 to 780 nanometers. Yi is determined before and/or after annealing.

The visual method uses four standard glass samples containing increasing quantities of yellow dye to establish a range of yellows. Samples are classified according to their respective levels of yellow.

The degree of polymerisation is determined by measurements of the near infrared peak for the methacrylic group double bond by observing the area of the 6160 $cm^{-1}$ peak which corresponds to the first harmonic of the terminal methylene group CH bond vibration. The degree of polymerisation is given by:

$$p = \frac{\text{Area } (t=0) - \text{Area } (t)}{\text{Area } (t=0)}$$

Thermomechanical properties are determined using a three point bending TMA apparatus. Lens rigidity is characterized by the high temperature moduli in the rubber-like region.

The following examples illustrate but do not limit the scope of the invention.

For examples 1 to 6, an initial mixture was prepared by homogenisation for one hour of specific amounts of tetraethoxy bisphenol A dimethacrylate sold by AKZO under the trade name Diacryl 121 and, if required, methacrylic monomers (ethyl methacrylate, butanediol dimethacrylate). Cyclohexyl peroxydicarbonate was used as catalyst in a proportion of 0.5% with respect to the total formulation.

Allyl alcohol derivatives having formula IV were introduced in the proportions indicated below just before casting into an apparatus constituted by two two-pat glass moulds and an EVA gasket. The assembly then underwent an 18 hour thermal cycle starting from a temperature of 48° C. and arriving at 85° C. after 16 hours.

The polymerised articles thus produced were annealed for three hours at 110° C. before measurement of their properties.

Except when specified, the final articles have a thickness of 2 mm.

EXAMPLE 1

A mixture as described above was prepared by homogenising tetraethoxy bis-phenol A dimethacrylate sold by AKZO under the trade name Diacryl 121 and ethyl methacrylate in proportions of 92 parts Diacryl 121 to 8 parts ethyl methacrylate with stirring. This mixture was catalysed with 0.5% by weight of cyclohexyl peroxydicarbonate (CHPC). A compound having the following formula IV was then introduced into the resulting composition:

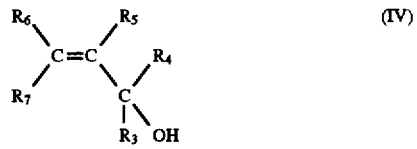

wherein $R_3$, $R_4$, $R_5$ and $R_6$ have the meanings shown in the table below.

TABLE 1

| Additives | $R_3$ | $R_4$ | $R_5$ | $R_6$ | $R_7$ | Mass % | Yi | visual | E (MPa) |
|---|---|---|---|---|---|---|---|---|---|
| ref | | | | | | 0 | 2.95 | 3 | 47 |
| allyl alcohol | H | H | H | H | H | 2 | 1.52 | 2 | 58 |
| methallyl alcohol | H | H | Me | H | H | 0.99 | 1.47 | 2 | 67 |
| crotyl alcohol | H | H | H | H | Me | 1.08 | 1.64 | 2 | 57 |
| trans 2-hexene-1-ol | H | H | H | H | Et | 2 | 1.81 | 2 | 60 |
| cis 2-butene-1,4-diol | H | H | H | H | $CH_2OH$ | 2 | 1.53 | 2 | |
| 3-methyl-2-butene-1-ol | H | H | H | Me | Me | 0.98 | 1.36 | 2 | |
| cyclo 2-hexene-1-ol | H | C | H | H | C | 2.06 | 1.64 | 2 | 59 |

C represents a cycle
"Yi" is the yellow index, "visual" is the visually determined index; E represents the modulus of elasticity in the rubber-like region (150° C.).

In each case, a considerable reduction in the yellow index and improvement in mechanical properties were observed.

EXAMPLE 2

The polymerisable composition of Example 1 was used with the same catalyst in the proportions indicated in Example 1. The following results were obtained:

TABLE II

| Additive | % | Yi | p | E (100° C.) | E (150° C.) |
|---|---|---|---|---|---|
| allyl alcohol | 0 | 2.95 | 93 | 57 | 47 |
| " | 0.55 | 2.16 | 93 | | |
| " | 1.01 | 1.95 | 96 | | |
| " | 1.51 | 1.89 | 97 | | |
| " | 2 | 1.54 | 95 | | 58 |
| " | 2.45 | 1.48 | | | |
| " | 3 | 1.48 | | | |
| 2-methyl-2-propene-1-ol | 0.98 | 1.57 | >93 | 83 | 66 |
| " | 1.47 | 1.54 | >93 | 87 | 77 |
| " | 1.97 | 1.47 | >93 | 82 | 67 |
| " | 2.48 | 1.47 | >93 | 89 | 74 |
| " | 2.96 | 1.55 | >93 | 76 | 64 |
| " | 3.9 | 1.75 | >93 | 71 | 62 |

EXAMPLE 3

A polymerisable composition was used comprising 85 parts by weight of Diacryl D 121 and 15 parts by weight of 1,4-butanediol dimethacrylate which had been homogenized as described above. 0.5% by weight of cyclohexyl peroxydicarbonate was used as catalyst. The following results were obtained:

TABLE III

| Additive | % | Yi | p | E (150° C.) |
|---|---|---|---|---|
| allyl alcohol | 0 | 2.54 | 86 | 106 |
| " | 1 | 2.26 | 89 | 133 |
| " | 1.5 | 2.2 | 89 | 115 |

EXAMPLE 4

A polymerisable composition was prepared using tetraethoxy bis-phenol A dimethacrylate sold by AKZO under the trade name Diacryl 121. This monomer was mixed with 0.5% by weight of cyclohexyl peroxydicarbonate. The compounds shown in Table IV were then introduced as additives to give the results indicated below.

TABLE IV

| Additive | % | Yi | p | E (100° C.) | E (150° C.) |
|---|---|---|---|---|---|
| 2-methyl-2-propene-1-ol | 10 | 1.73 | >93 | | |
| | 8 | 2.06 | >93 | 84.67 | 71.6 |
| | 5 | 2.13 | >93 | 88.97 | 73.58 |
| crotyl alcohol | 5 | 2.36 | >93 | 78.18 | 69.19 |
| 2-cyclohexene-1-ol | 5 | 1.87 | >93 | 49.34 | 53.42 |

EXAMPLE 5

Polymerisable compositions were prepared using the monomers shown in Table V.

TABLE V

| Example | Monomer I | Comonomers II | Composition | Initiator |
|---|---|---|---|---|
| 5 A | D121 | isobornyl methacrylate | 80/20 | CHPC (0.5%) |
| 5 B | D121 | benzyl methacrylate | 80/20 | CHPC (0.5%) |
| 5 C | D121 | styrene | 80/20 | CHPC (0.5%) |
| 5 D | D121 | | 100 | CHPC (0.5%) |

The results are shown in Table VI.

TABLE VI

| Formulations | Yi after annealing | Yellow level |
|---|---|---|
| A | 2.32 | 4 |
| A + 2% methallyl alcohol | 1.17 | 2 |
| B | 2.3 | 4 |
| B + 2% methallyl alcohol | 1.21 | 2 |
| C | 1.75 | 3 |
| C + 2% methallyl alcohol | 1.39 | 2 |
| D | 4 | 4 |
| D + 2% methallyl alcohol | 1.9 | 2 |

Visual determination of the yellow level was carried out as follows:

- level 0: corresponds to the colour of Orma without any addition of yellow dye (Orma is the trade name for a polymer material obtained from diethyleneglycol bis (allyl carbonate) manufactured by ESSILOR and used as a reference material;
- level 1: Orma+0.0025% of yellow dye Neozapon 157;
- level 2: Orma+0.01% of yellow dye Neozapon 157;
- level 3: Orma+0.025% of yellow dye Neozapon 157.

The levels were determined in accordance with the following table

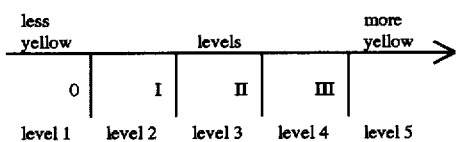

EXAMPLE 6

A polymerisable composition was prepared using tetraethoxy bis-phenol A dimethacrylate sold by AKZO under the trade name Diacryl 121.

The compounds shown in Table VII were then introduced as additives in the proportions indicated. To this mixture, a photoinitiator was added in a proportion of about 0.1%.

The said photoinitiator is CGI 1700 of CIBA-GEIGY which is a mixture containing the following compounds:

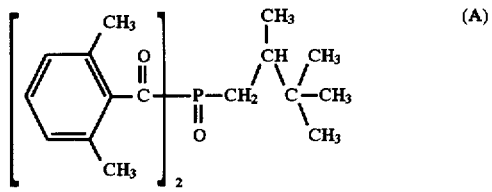

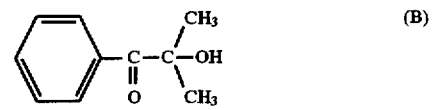

in a ratio B/A=75/25.

After casting in a mould, the mixture was irradiated by a mercury lamps during 5 minutes. An annealing was then carried out during one hour at 120° C. The final article has a thickness of 2 mm.

The additives shown in Table VII are corresponding to the formula (IV)

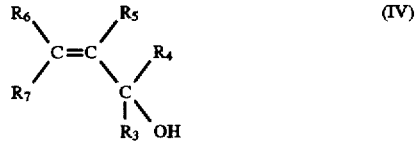

TABLE VII

| Additives | $R_3$ | $R_4$ | $R_5$ | $R_6$ | $R_7$ | Yi | % additive |
|---|---|---|---|---|---|---|---|
| 3-butene-2-ol | H | $CH_3$ | H | H | H | 2.7 | 1.7 |
| trans 2-methyl-3-phenyl 2-propene-1-ol | H | H | $CH_3$ | phenyl | H | 1.8 | 3.8 |
| carveol | Cycle | H | $CH_3$ | H | Cycle | 1.2 | 3.7 |
| myrtenol | H | H | Cycle | Cycle | H | 1.5 | 3.5 |
| verbenol | Cycle | H | H | $CH_3$ | Cycle | 2.3 | 3.5 |
| trans cinnamyl alcohol | H | H | H | phenyl | H | 1.65 | 3 |
| 3-methyl-2-butene-1-ol | | | | | | 1.5 | 2 |
| Reference | | | | | | 3.5 | 0 |

EXAMPLES 7 TO 13 AND COMPARATIVE EXAMPLES REF. 1 TO 3

Ophthalmic substrates of 12 mm thickness were prepared from different compositions comprising a basic monomer mixture consisting of about 55% by weight of diethoxydimethacrylate bisphenol A and about 45% by weight of dilution monomers consisting essentially of mono and dimethacrylate derivatives. This mixture of monomers will be designated throughout the remaining part of the description as the "basic monomer mixture".

The prepared compositions are given in Table VIII below.

TABLE VIII

| | Compositions (parts by weight) | | | | | | | | | |
|---|---|---|---|---|---|---|---|---|---|---|
| | Ref. 1 | Ref. 2 | Ref. 3 | 7 | 8 | 9 | 10 | 11 | 12 | 13 |
| Basic monomer mixture | 99.9 | 99.86 | 99.7 | 99.51 | 99.15 | 98.9 | 99.65 | 99.52 | 99.29 | 99.15 |
| Photoinitiator CGI 1700 | 0.1 | 0.1 | 0.1 | 0.1 | 0.1 | 0.1 | 0.1 | 0.1 | 0.1 | 0.1 |
| 3-methyl-2-butene-1-ol | 0 | 0 | 0 | 0.39 | 0.75 | 1 | 0.22 | 0.31 | 0.51 | 0.71 |
| Triphenyl-phosphine | 0 | 0.04 | 0.2 | 0 | 0 | 0 | 0.03 | 0.07 | 0.10 | 0.04 |

Triphenylphosphine is a usual anticoloring agent.

Each of the compositions of Table VIII was cast into a mould comprised of two mould parts made of transparent mineral glass, and subjected to a polymerisation by UV irradiation.

Irradiation was performed in two steps.

In a first step, the moulds were subjected to an irradiation of energy surface density of 3 J/cm² in a period of time of 30 seconds (prepolymerisation).

In a second step, performed immediately after the first step, the moulds were subjected to an irradiation of energy surface density of 14.4 J/cm² in a period of time of 120 seconds (polymerisation).

After withdrawal from the moulds the resulting ophthalmic substrates were subjected to a thermal annealing for 3 hours at 135° C.

YELLOWNESS INDEX MEASUREMENTS

The yellowness index of the substrates was determined both before and after annealing. The results are given in the Table IX below.

TABLE IX

| | Yellowness index | | | | | | | | | |
|---|---|---|---|---|---|---|---|---|---|---|
| | Ref 1 | Ref. 2 | Ref. 3 | 7 | 8 | 9 | 10 | 11 | 12 | 13 |
| Yi after photopolymerisation | 5 | 4.6 | 4.4 | 3.4 | 3.2 | 2.1 | 3.2 | 2.9 | 3 | 2.9 |
| Yi after annealing 3 h at 135° C. | 7.9 | 5.4 | 4.5 | 6.1 | 5.5 | 5.9 | 4 | 3.5 | 4.1 | 3.7 |

The above results show that 3-methyl 2-butene 1-ol acts upon the yellow level both before and after annealing, even at low concentration.

On the other hand, the incorporation of triphenylphosphine further limits yellowing during the annealing.

PREPARATION OF PHOTOCHROMIC SUBSTRATES

The substrates obtained from compositions of comparative example Ref. 1 and of examples 7, 8, 9, 11 and 12 were subjected to a photochromatization by thermal transfer.

The thermal transfer process is well-known and is disclosed in U.S. Pat. Nos. 4,286,395 and 4,880,667.

To this end, a cellulose acetobutyrate base photochromic varnish including a chromene type photochromic compound was prepared.

Each of the substrates were coated with the varnish and the coated substrates were placed in an oven at 135° C. for 5 hours.

Thereafter, the substrates were withdrawn and cooled to ambient temperature in air. The varnish films were peeled off. Penetration depths of the photochromic compounds into the substrates were determined to be 100–150 μm.

The kinetic of the photochromic compound incorporated into the substrates was then measured at a temperature of 29° C.

The substrates were irradiated for 8 minutes using a lamp (solar simulator) providing a visible light of 65.6±5 klux and a UV light of 8.98±5 W/cm².

Following this 8 minutes irradiation, optical density of each substrate was measured at the wavelength corresponding to the maximum of absorption in visible light of the photochromic compound incorporated into the substrate. This measured optical density is referred to as the maximal optical density $DO_8$.

After shut off the lamp, optical density measurement was pursued and for each substrate the time after which the optical density reached the value $$DO = \frac{DO_8 - [DO_8 - DO_0]}{2},$$

where $DO_0$ is the substrate optical density at the non-activated initial state, was noted. This time (t½), in seconds, is referred to as the bleach rate.

The results are given in the Table X below.

TABLE X

|  | Ref. 1 | 7 | 8 | 9 | 11 | 12 |
|---|---|---|---|---|---|---|
| t½ seconds | 51 | 43 | 41 | 40 | 44 | 45 |

The above results show that the photochromic substrates according to examples 7, 8, 9, 11 and 12 exhibit a faster decoloration kinetic than the reference substrate.

EXAMPLES 13 AND 14

A second series of tests was effected in the same manner as previously disclosed but using cinammyl alcohol instead of 3-methyl-2-butene-1-ol.

The compositions and results for Yi and t½ are given in the Table XI below

TABLE XI

|  | Ref. 1 | 13 | 14 |
|---|---|---|---|
| Basic monomer mixture | 99.9 | 99.39 | 98.88 |
| Potoinitiator CGI 1700 | 0.1 | 0.1 | 0.1 |
| Cinnamic alcohol | 0 | 0.51 | 1.02 |
| Triphenylphosphine | 0 | 0 | 0 |
| Yi after photopolymerisation | 5 | 3.4 | 3.6 |
| Yi after annealing 3 h at 135° C. | 7.9 | 6.87 | 6.5 |
| t½ seconds | 51 | 26 | 31 |

The results show that the photochromic kinetic of the substrates of Examples 13 and 14 is greatly improved compared with reference substrate Ref. 1.

What is claimed is:

1. A polymer composition obtained by polymerisation of a composition comprising:

a component A comprising:
   • at least 50% by weight of a monomer or mixture of monomers having formula I:

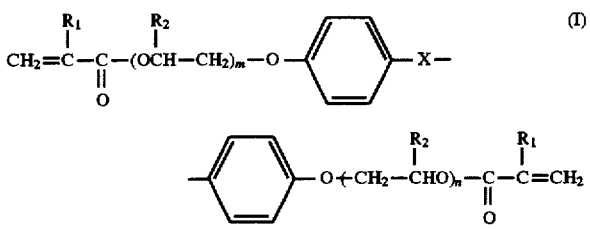

wherein $R_1$ and $R_2$, which may be identical or different, represent hydrogen of $C_1$–$C_6$ alkyl, X represents:

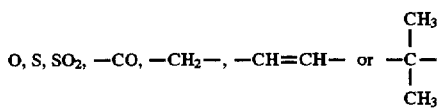

m and n are integers
   and m+n is between 0 and 10;

0 to 50% by weight of one or more mono- or polyfunctional vinyl, acrylic or methacrylic comonomers (II); and a component B comprising:
   • in a proportion of 0.05 to 15% by weight with respect to the weight of components (I) and (II), at least one monomer (III) comprising an ethylenic unsaturation which does not form part of an aromatic ring and containing in position α of this unsaturation, a carbon atom carrying a free hydroxy group.

2. The polymer composition of claim 1, wherein the monomer (III) contains in position α of the unsaturation, a carbon atom carrying a free hydroxy group and being linked to at least one hydrogen atom.

3. The polymer composition of claim 1, wherein the monomer (III) has formula (IV):

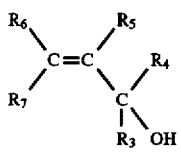

wherein $R_3$ and $R_4$ represent hydrogen or one of the groups $R_3$ and $R_4$ represent hydrogen while the other forms with group $R_7$ a $C_5$–$C_{10}$ ring which may be substituted by one or more linear or branched $C_1$–$C_4$ alkyl groups or one or more $C_2$–$C_4$ alkylene groups; or one of groups $R_3$ and $R_4$ may represent hydrogen while the other represents an aliphatic $C_1$–$C_6$ alkyl group, a cyclic $C_4$–$C_{16}$ hydrocarbon group or a $C_6$–$C_{16}$ aromatic hydrocarbon group;

$R_5$, $R_6$ and $R_7$, independently of each other, represent hydrogen or a $C_1$–$C_6$ alkyl group which may be substituted by one or more OH groups and wherein the chain may be interrupted by one or more ether, ester or ketone groups; an aromatic $C_6$–$C_{16}$ hydrocarbon group or a cyclic $C_4$–$C_{16}$ hydrocarbon group;

$R_7$ may form with one of the groups $R_3$ or $R_4$ and $C_5$–$C_{10}$ ring which may be substituted by one or more linear or branched $C_1$–$C_4$ alkyl groups or one or more $C_2$–$C_4$ alkylene groups;

$R_5$ and $R_6$ may form a $C_5$–$C_{10}$ ring which may be substituted by one or more $C_1$–$C_4$ alkyl groups or $C_2$–$C_4$ alkylene groups;

two or more of the carbon atoms of the $C_5$–$C_{10}$ ring formed with $R_3$ or $R_4$ and $R_7$ or with $R_5$ and $R_6$, may be bonded by a hydrocarbon bridge.

4. The polymer composition of claim 3, wherein $R_3$ and $R_4$ represent hydrogen, $R_5$ represents methyl, $R_6$ represents hydrogen or methyl and $R_7$ represents hydrogen, methyl, ethyl or $CH_2OH$.

5. The polymer composition of claim 3, wherein the compound having forumla (IV) is selected from the group consisting of allyl alcohol, methallyl alcohol, crotyl alcohol, 2-cyclohexene-1-ol, trans 2-hexenez-1-ol, cis 2-butene-1,4-diol, 3-methyl-2-butene-1-ol, trans 2-methyl-3-phenyl-2-propene-1-ol, 3-butene-2-ol, carveol, myrtenol, verbenol and trans-cinnamyl alcohol.

6. The polymer composition of claim 1, wherein the compound having formula I is used in proportions between 70 and 100% by weight with respect to the weight of component A.

7. The polymer composition of claim 1, wherein $R_1$ represents $CH_3$ and $R_2$ represents H and X represents

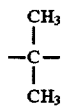

m and n are integers and m+n is a whole number between 2 and 7.

8. The polymer composition of claim 1, wherein the monomers having formula (II) are selected from the group consisting of phenyl(meth)acrylate, benzyl(meth)acrylate, phenoxyethyl(meth)acrylate and styrene or from the non-aromatic compounds which are selected from the group consisting of methyl(meth)acrylate, ethyl(meth)acrylate, butyl(meth)acrylate or isobutyl(meth)acrylate, butanedioldi(meth)acrylate, and trimethylolpropane tri(meth)acrylate.

9. The polymer composition of claim 1, wherein the compound having formula I is 2,2-bis (4-methacroyl oxdiethoxyphenyl)propane.

10. The polymer composition of claim 1, wherein component B comprises 0.1 to 15% by weight of monomer (III).

11. The polymer composition of claim 1, wherein component B comprises 0.1 to 5% by weight of monomer (III).

12. The polymer composition of claim 1, which further comprises a phosphinic anticoloring agent.

13. The polymerisable composition of claim 12, wherein the monomer (III) has formula (IV):

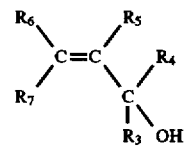

wherein $R_3$ and $R_4$ represent hydrogen or one of the groups $R_3$ and $R_4$ represent hydrogen while the other forms with group $R_7$ a $C_5$–$C_{10}$ ring which may be substituted by one or more linear or branched $C_1$–$C_4$ alkyl groups or one or more $C_2$–$C_4$ alkylene groups; or one of groups $R_3$ and $R_4$ may represent hydrogen while the other represents an aliphatic $C_1$–$C_6$ alkyl group, a cyclic $C_4$–$C_{16}$ hydrocarbon group or a $C_6$–$C_{16}$ aromatic hydrocarbon group;

$R_5$, $R_6$ and $R_7$, independently of each other, represent hydrogen or a $C_1$–$C_6$ alkyl group which may be substituted by one or more OH groups and wherein the chain may be interrupted by one or more ether, ester or ketone groups; an aromatic $C_6$–$C_{16}$ hydrocarbon group or a cyclic $C_4$–$C_{16}$ hydrocarbon group;

$R_7$ may form with one of the groups $R_3$ or $R_4$ and $C_5$–$C_{10}$ ring which may be substituted by one or more linear or branched $C_1$–$C_4$ alkyl groups or one or more $C_2$–$C_4$ alkylene groups;

$R_5$ and $R_6$ may form a $C_5$–$C_{10}$ ring which may be substituted by one or more $C_1$–$C_4$ alkyl groups or $C_2$–$C_4$ alkylene groups; two or more of the carbon atoms of the $C_5$–$C_{10}$ ring formed with $R_3$ or $R_4$ and $R_7$ or with $R_5$ and $R_6$, may be bonded by a hydrocarbon bridge.

14. The polymer composition of claim 12, wherein the phosphinic anticoloring agent is triphenylphosphine.

15. A photochromic substrate made of a polymer composition according to claim 14, wherein at least one photochromic compound is incorporated within the substrate.

16. The photochromic substrate of claim 15, wherein the photochromic compound is incorporated within the substrate to a depth of 100 to 150 µm from a surface of the substrate.

17. A method of preparing a polymer composition as defined in claim 1 comprising:

mixing one or more monomers having formula I and II and 0.05 to 15% by weight with respect to the weight of monomers having formula I and II of at least one monomer (III), and polymerising the mixture.

18. The method of claim 17, wherein the monomer (III) has formula (IV):

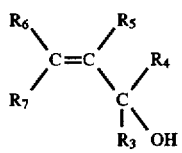  (IV)

wherein

R₃ and R₄ represent hydrogen or one of the groups R₃ and R₄ represent hydrogen while the other forms with group R₇ a $C_5$–$C_{10}$ ring which may be substituted by one or more linear or branched $C_1$–$C_4$ alkyl groups or one or more $C_2$–$C_4$ alkylene groups; or one of groups R₃ and R₄ may represent hydrogen while the other represents an aliphatic $C_1$–$C_6$ alkyl group, a cyclic $C_4$–$C_{16}$ hydrocarbon group or a $C_6$–$C_{16}$ aromatic hydrocarbon group;

R₅, R₆ and R₇, independently of each other, represent hydrogen or a $C_1$–$C_6$ alkyl group which may be substituted by one or more OH groups and wherein the chain may be interrupted by one or more ether, ester or ketone groups; an aromatic $C_6$–$C_{16}$ hydrocarbon group or a cyclic $C_4$–$C_{16}$ hydrocarbon group;

R₇ may form with one of the groups R₃ or R₄ and $C_5$–$C_{10}$ ring which may be substituted by one or more linear or branched $C_1$–$C_4$ alkyl groups or one or more $C_2$–$C_4$ alkylene groups;

R₅ and R₆ may form a $C_5$–$C_{10}$ ring which may be substituted by one or more $C_1$–$C_4$ alkyl groups or $C_2$–$C_4$ alkylene groups;

two or more of the carbon atoms of the $C_5$–$C_{10}$ ring formed with R₃ or R₄ and R₇ or with R₅ and R₆, may be bonded by a hydrocarbon bridge.

19. The method of claim 17, wherein the polymerisation is carried out photochemically.

20. The method of claim 17, wherein the polymerisation is carried out by induction heating.

21. An ophthalmic lens made of a polymer composition obtained by the method according to claim 17.

22. An ophthalmic lens made from a polymer composition according to claim 1.

23. A lens assembly characterized in that it comprises at least one lens as defined in claim 22.

24. A photochromic substrate made of a polymer composition according to claim 1, wherein at least one photochromic compound is incorporated within the substrate.

25. The photochromic substrate of claim 24, wherein the photochromic compound is incorporated within the substrate to a depth of 100 to 150 μm from a surface of the substrate.

26. A polymiserable composition comprising at least 50% by weight of a monomer or mixture of monomers having formula I:

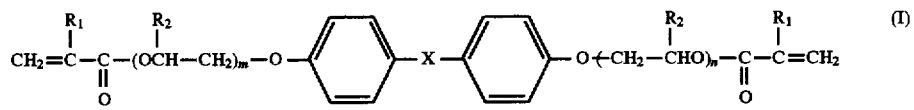  (I)

wherein R₁ and R₂, which may be identical or different, represent hydrogen or $C_1$–$C_6$ alkyl, X represents:

$$O, S, SO_2, -CO, -CH_2-, -CH=CH- \text{ or } -\underset{CH_3}{\overset{CH_3}{\underset{|}{\overset{|}{C}}}}-$$

m and n are integers
and m+n is between 0 and 10;

0 to 50% by weight of one or more mono- or polyfunctional vinyl, acrylic or methacrylic comonomers (II); and a component B comprising:
  •in a proportion of 0.05 to 15% by weight with respect to the weight of components (I) and (II), at least one monomer (III) comprising an ethylenic unsaturation which does not form part of an aromatic ring and containing in position α of this unsaturation, a carbon atom carrying a free hydroxy group.

27. The polymerisable composition of claim 26, wherein component B comprises 0.1 to 15% by weight of monomer (III).

28. The polymerisable composition of claim 26, wherein component B comprises 0.1 to 5% by weight of monomer (III).

29. The polymerisable composition of claim 26, wherein the monomer (III) contains in position α of the unsaturation, a carbon atom carrying a free hydroxy group and linked to at least one hydrogen atom.

30. The polymerisable composition of claim 26, further comprising a phosphinic anticoloring agent.

31. The polymerisable composition of claim 30, wherein the phosphinic anticoloring agent is triphenylphosphine.

32. A method of preparing a finished or semi-finished lens comprising casting a polymerisable composition according to claim 26, between two moulds having the required surface geometries and polymerising the composition.

* * * * *

UNITED STATES PATENT AND TRADEMARK OFFICE
CERTIFICATE OF CORRECTION

PATENT NO.     :  5,702,825

DATED          :  December 30, 1997

INVENTOR(S)    :  Gabriel Keita, Joel Renaudineau and Leanirith Yean

It is certified that error appears in the above-identified patent and that said Letters Patent is hereby corrected as shown below:

In claim 5, column 13, line 44, delete "hexenez" and insert --hexene-- therefor.

Signed and Sealed this

Seventeenth Day of March, 1998

Attest:

BRUCE LEHMAN

*Attesting Officer*    *Commissioner of Patents and Trademarks*